United States Patent

Bowman et al.

[11] Patent Number: 5,851,407
[45] Date of Patent: *Dec. 22, 1998

[54] PROCESS AND APPARATUS FOR OXIDATION OF CONTAMINANTS IN WATER

[75] Inventors: Reid Bowman, Ojai; Michael McNeilly, Redwood Shores; Terry Applebury, Lafayette; Douglas Gustafson, Antioch, all of Calif.

[73] Assignee: Applied Process Technolgy, Inc., Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 978,752

[22] Filed: Nov. 26, 1997

[51] Int. Cl.$^6$ .................................................. C02F 1/78
[52] U.S. Cl. ..................... 210/759; 210/96.1; 210/192; 210/205; 210/220; 210/760; 261/DIG. 42
[58] Field of Search ................... 210/192, 759, 210/760, 220, 205, 96.1; 261/DIG. 42

[56] References Cited

U.S. PATENT DOCUMENTS

| | | | |
|---|---|---|---|
| 4,648,978 | 3/1987 | Makinen et al. | 210/760 |
| 4,674,888 | 6/1987 | Carlson | 366/337 |
| 4,792,407 | 12/1988 | Zeff et al. | 210/759 |
| 4,849,114 | 7/1989 | Zeff et al. | 210/748 |
| 4,990,316 | 2/1991 | Duguet | 210/760 |
| 5,190,669 | 3/1993 | Weibel | 210/759 |
| 5,232,604 | 8/1993 | Swallow et al. | 210/760 |
| 5,273,664 | 12/1993 | Schulz | 210/759 |
| 5,352,369 | 10/1994 | Heinig, Jr. | 210/760 |
| 5,364,537 | 11/1994 | Paillard | 210/760 |
| 5,415,785 | 5/1995 | Braden et al. | 210/752 |
| 5,498,347 | 3/1996 | Richard | 210/739 |
| 5,578,205 | 11/1996 | Martin | 210/199 |
| 5,609,766 | 3/1997 | Schneider et al. | 210/662 |
| 5,663,475 | 9/1997 | Elgal | 210/759 |

FOREIGN PATENT DOCUMENTS

| | | | |
|---|---|---|---|
| 0 257 983 A2 | 3/1988 | European Pat. Off. | C02F 11/08 |
| 0 577 157 A2 | 1/1994 | European Pat. Off. | D21C 9/16 |
| 0 701 972 A1 | 9/1994 | European Pat. Off. | C02F 1/32 |
| 90 14 034.6 U | 2/1991 | Germany | B67D 5/54 |
| 581 493 | 9/1976 | Switzerland | B01F 5/00 |

OTHER PUBLICATIONS

Glaze, et al., "Advanced Oxidation Processes for Treating Groundwater Contaminated With TCE and PCE: Laboratory Studies," *Journal AWWA*, pp. 57–63 (1988).

Karimi, et al., "Evaluating an AOP for TCE and PCE Removal," *Journal AWWA*, pp. 41–53 (1997).

Karimi, "Treatment of Groundwater Contamination with TCE & PCE by Advanced Oxidation Process," Slide Presentation, 23 pages (1996).

Martin, et al., "Use of Static Mixer for Oxidation and Disinfection by Ozone," *Ozone Science & Engineering*, 16, pp. 455–473 (1994).

(List continued on next page.)

*Primary Examiner*—Jay H. Woo
*Assistant Examiner*—Betsey J. Morrison
*Attorney, Agent, or Firm*—Limbach & Limbach L.L.P.

[57] ABSTRACT

Oxidizable contaminants in water are destroyed quickly and efficiently by exposing a contaminated water flow to oxidizing conditions under pressure. Specifically, ozone generated from oxygen and hydrogen peroxide are injected into the water flow in at least one, and preferably more than one, high intensity mixing/reaction stage. The ozone and hydrogen peroxide are injected at velocities and directions approximately matching those of the contaminated water flow. High intensity mixing under pressure facilitates rapid and complete oxidation of the contaminants with minimal stripping of volatile contaminants and waste of undissolved ozone. Residual ozone levels after high intensity mixing are carefully monitored and minimized by adjusting the injection of hydrogen peroxide and ozone in order to suppress the formation of bromate.

8 Claims, 9 Drawing Sheets

OTHER PUBLICATIONS

Richards, et al., "Mass Transfer Coefficients for the Ozone-–Water Systems," *AIChE Symposium Series,* 73 (166), pp. 213–224 (1976).

Krasner, et al., "Impact of Water Quality and Operational Parameters on the Formation and Control of Bromate During Ozonation," *Water Supply,* 13 (1), pp. 145–156 (1995).

Siddiqui, et al., "Bromate Ion Formation: A Critical Review," *Journal AWWA,* pp. 58–69 (1995).

Siddiqui, et al., "Alternative Strategies for Removing Bromate," *Journal AWWA,* pp. 81–96 (1994).

von Gunten, et al., "Bromate Formation in Advanced Oxidation Processes," *Journal AWWA,* pp. 53–65 (1996).

Karpel Vel Leitner, et al., "Oxidation Of Methyl tert–Butyl Ether (MTBE) and Ethyl tert–Butyl Ether (ETBE) By Ozone and Combined Ozone/Hydrogen Peroxide," *Ozone Science & Engineerng,* 16, pp. 41–54 (1994).

Dyksen, et al., "In–line Ozone and Hydrogen Peroxide Treatment for Removal of Organic Chemicals," AWWA Research Foundation, 88 pages (1992).

PROCESS AND APPARATUS FOR OXIDATION OF CONTAMINANTS IN WATER

CROSS-REFERENCE TO RELATED APPLICATION

This application claims the benefit of U.S. provisional application No. 60/032,336, filed Dec. 4, 1996, entitled "Multistage Reactor For the Oxidation of COD in Water", inventors Terry Applebury, Reid Bowman and Doug Gustafson; U.S. provisional application No. 60/032,404, filed Dec. 4, 1996 and entitled "Rapid Destruction of VOC with Hydrogen Peroxide and Ozone", inventors Michael McNeilly, Terry Applebury, and Doug Gustafson; and U.S. provisional application No. 60/035,890, filed Jan. 23, 1997, entitled "Use of Ozone Generated From Pressurized Oxygen For the Treatment of Groundwater", inventors Michael McNeilly, Reid Bowman, and Doug Gustafson. The text of these related applications is hereby incorporated by reference.

BACKGROUND OF THE INVENTION

1. Field of the Invention

The present invention relates to water decontamination, and more particularly, to apparatuses and processes for chemically oxidizing contaminants in water by mixing ozone and hydrogen peroxide into contaminated water flowing under pressure, and subsequently maintaining the mixture under pressure.

2. Description of the Related Art

Heightened awareness of the risks to human health posed by environmental contaminants has led to the imposition of stringent limits on levels of contamination in drinking water. For example, the current maximum concentration of trichloroethylene (TCE) permitted by the United States Environmental Protection Agency is 5 ppb. TCE belongs to a class of compounds known as volatile organic contaminants, or VOC's. Because of their toxicity and/or carcinogenic properties, VOC's must be removed before water can be utilized for most purposes.

Controlled oxidation of contaminated water flows to destroy contamination is meeting with increased acceptance as a means for decontamination. One example is the so-called "advanced oxidation process", wherein ozone ($O_3$) and hydrogen peroxide ($H_2O_2$) are introduced into the water flow and react with each other to form the hydroxyl radical (HO·), a powerful oxidizing species. Hydrogen peroxide, ozone, and hydroxyl radical then encounter and oxidize contaminants, destroying them. Glaze and Kang, J. Amer. Water Works Assoc., 80, 51 (1988) describe an advanced oxidation process wherein ozone ($O_3$) and hydrogen peroxide ($H_2O_2$) are introduced into a contaminated water flow at atmospheric pressure.

Conventional oxidation decontamination systems utilizing ozone suffer from a number of serious disadvantages. First, the rate of ozone destruction in conventional systems has been documented as being initially very rapid. However, no corresponding rapid destruction of contaminants during the initial mixing of ozone and hydrogen peroxide in water has been observed or reported. Thus, conventional oxidation decontamination oxidation processes utilizing ozone are relatively inefficient, consuming large quantities of relatively expensive ozone while eliminating only modest amounts of contaminants.

Therefore, it is desirable to design oxidation decontamination processes and apparatuses utilizing ozone that enhance mixing and hence reduce the time required for ozone, hydrogen peroxide, and/or the hydroxyl radical to encounter contaminants present in the water, thereby maximizing oxidation.

A second disadvantage of conventional oxidation decontamination systems that utilize ozone is that they promote formation of unwanted "disinfection byproducts." For example, bromide ions ($Br^-$), naturally present in the water, can undergo a series of reactions to produce bromate ($BrO_3^-$):

$$3Br^- + O_3 \text{ (only)} \rightarrow 3BrO^- \qquad (1)$$

$$BrO^{31} + (O_3, H_2O_2, \text{ or } HO\cdot) \rightarrow BrO_3^- \qquad (2)$$

Bromate has recently been labelled as a suspected carcinogen, and the USEPA has established a maximum level for drinking water of 10 $\mu$g/L. It is thus important to prevent or minimize bromate formation during oxidation decontamination processes where water that may be ingested is being decontaminated.

In step (1) above, neither the hydroxyl radical (HO·) nor hydrogen peroxide oxidize bromide to form hypobromite ($BrO^-$). Therefore, it is desirable to create oxidation decontamination processes and apparatuses utilizing ozone wherein residual ozone levels are kept to a minimum in order to suppress the formation of bromate.

Figure 1:
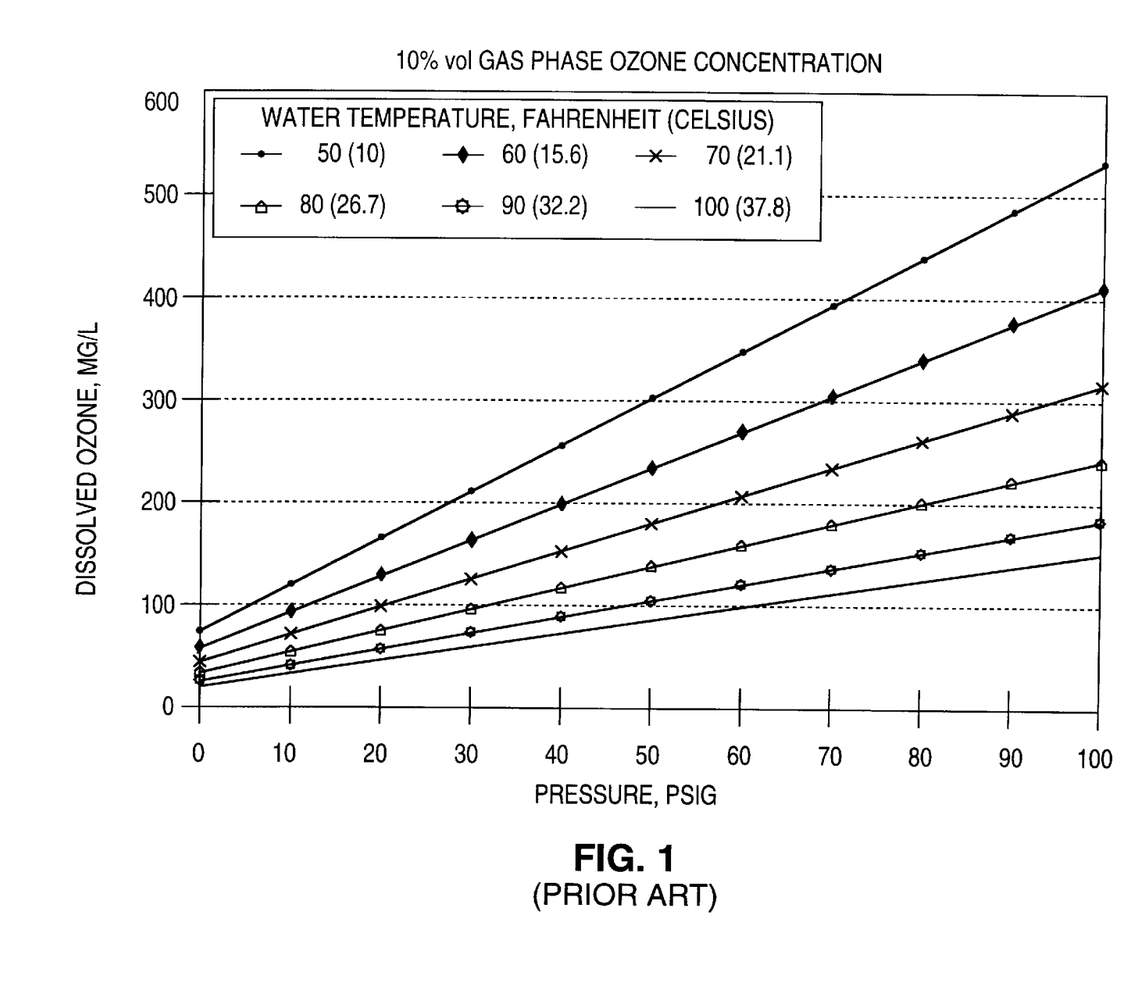
FIG. 1 plots overall pressure versus the concentration of ozone dissolved in water, based upon a 10% (v) concentration of ozone in the gas phase.

A third disadvantage of conventional oxidation decontamination systems that utilize ozone is the limited solubility of ozone in water at atmospheric pressure. FIG. 1 shows that the solubility of ozone in water increases with higher pressure. However, conventional oxidation decontamination systems introduce ozone at only atmospheric pressure, limiting the amount of ozone that can be dissolved in the water.

Therefore, it is desirable to design oxidation decontamination processes and apparatuses utilizing ozone wherein ozone is introduced to the contaminated water flow and maintained in solution under greater than atmospheric pressure, allowing more ozone to be dissolved in the water and react with hydrogen peroxide and oxidizable contaminants.

Figure 2:
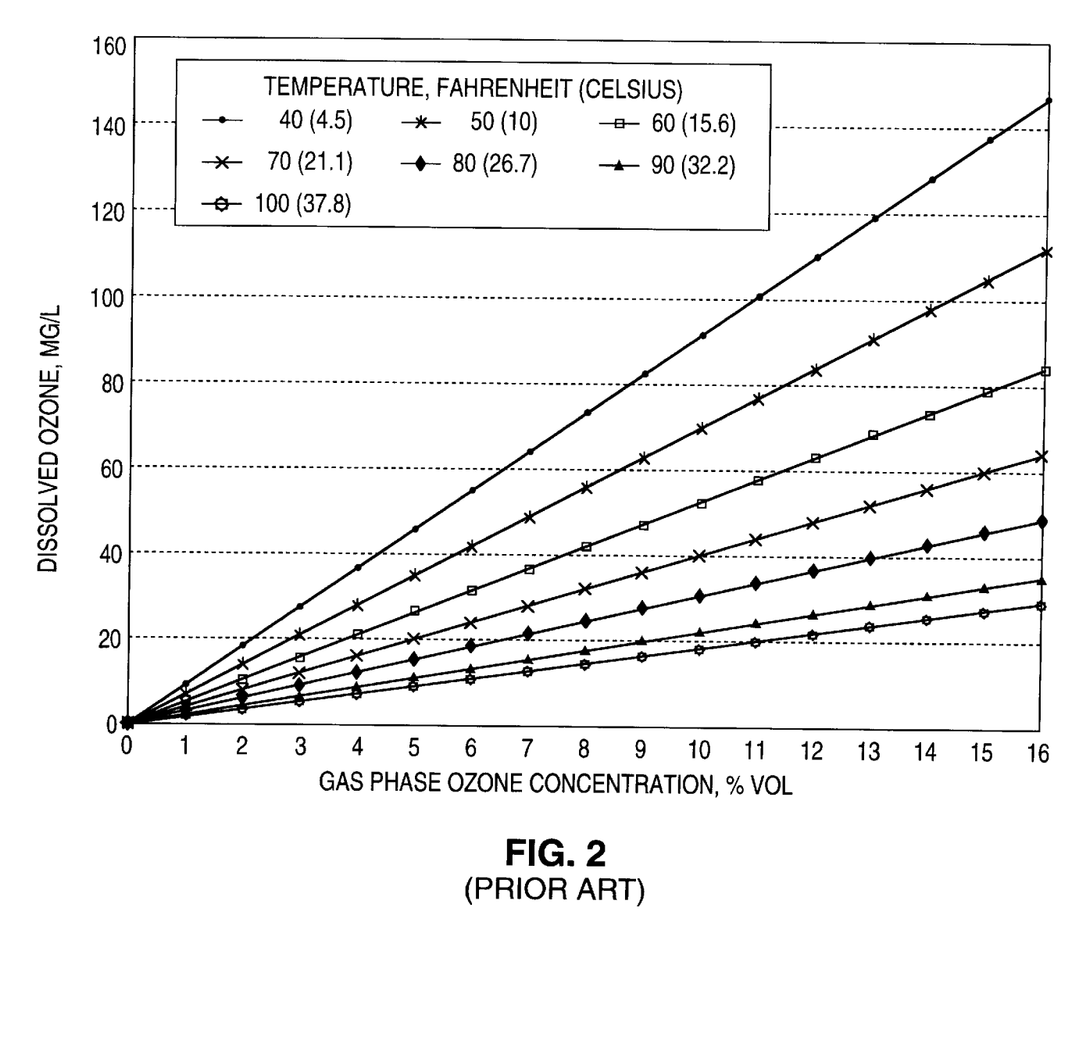
FIG. 2 plots the concentration of ozone in the gas phase versus the resulting concentration of ozone dissolved in water.

A fourth disadvantage associated with conventional oxidation decontamination systems that utilize ozone is the limited concentration of ozone normally present in the reactant gas stream that is mixed with the water. FIG. 2 shows that the solubility of ozone in water increases as the concentration of ozone present in the gas phase increases. Conventional oxidation systems utilize gas streams containing only about 1–4% ozone by weight in air, effectively limiting the amount of ozone that can be dissolved in the water.

An additional problem associated with the introduction of ozone in a stream of air is that the air can strip the water of VOC's and ozone, hindering the oxidation process and creating a waste gas stream that must be separately decontaminated.

Therefore, it is desirable to design oxidation decontamination processes and apparatuses utilizing ozone wherein ozone is generated from oxygen and constitutes a larger percentage of the reactant gas introduced into the water, thereby resulting in higher amounts of ozone being dissolved in the water and preventing stripping of ozone and VOC's.

A fifth disadvantage associated with conventional oxidation decontamination systems that utilize ozone is that the ozone is generally introduced into a side stream of contaminated water that has been diverted from the main flow in order to receive the ozone. The resulting elevated concentrations of ozone in the side stream relative to the entire flow creates several problems. First, subsequent introduction of the side stream containing the concentrated ozone may result in uneven mixing of the ozone in the overall water flow. Second, introduction of the ozone within the smaller volume of the side stream necessarily increases the local concentration of ozone and may lead to increased bromate formation.

Therefore, it is desirable to design oxidation decontamination processes and apparatuses utilizing ozone wherein ozone is injected "in-line" with the entire contaminated water flow, such that uniform mixing of ozone is rapidly achieved and local concentrations of ozone are kept to a minimum.

SUMMARY OF THE INVENTION

Water decontamination processes and apparatuses in accordance with the present invention rely upon injection of hydrogen peroxide and ozone under pressure directly into the contaminated water flow, followed by high intensity mixing and reaction under pressure. During the course of decontamination in accordance with the present invention, the ozone and the hydrogen peroxide react with each other to form the highly reactive hydroxyl radical, and the ozone and the hydrogen peroxide also react directly with contaminants. The resulting high concentration of hydroxyl radical, the relatively low concentration of residual ozone, and the rapid contact between oxidants and contaminants, enhance the efficiency and the effectiveness of oxidation while minimizing the formation of bromate. Decontamination in accordance with the present invention is particularly effective where ozone and hydrogen peroxide are injected in multiple stages.

A better understanding of the features and advantages of the present invention will be obtained by reference to the following detailed description and accompanying figures.

DETAILED DESCRIPTION OF THE INVENTION

In this application, the term "COD" refers to "chemical oxygen demand" compounds—chemicals that dissolve in water and which can be oxidized.

The oxidation decontamination processes and apparatuses of the present invention are uniquely useful to 1) maximize destruction of oxidizable contaminants; 2) minimize costs associated with the consumption of expensive oxidants; 3) eliminate costs associated with the "off-line" introduction of ozone into a side stream of contaminated water; and 4) control quantities of bromate formed as a result of oxidation. The heightened efficiency and effectiveness of oxidation in accordance with the present invention should permit implementation of decontamination projects previously considered unfeasible due to the degree of contamination and the expense required.

Oxidation of COD compounds in water with ozone and hydrogen peroxide in accordance with the present invention is accomplished with a reactor having at least one, and preferably more than one, high intensity mixing/reaction stage. Each high intensity mixing/reaction stage provides an environment wherein ozone and hydrogen peroxide are uniformly mixed with a contaminated water flow within a period of approximately thirty seconds or less, and the oxidation reactions are then allowed to proceed with a minimum of residual ozone present.

During each high intensity mixing/reaction stage, ozone and hydrogen peroxide react with each other to form the hydroxyl radical (HO·). The hydroxyl radical, ozone, and hydrogen peroxide then oxidize the COD compounds, destroying them.

Figure 3:
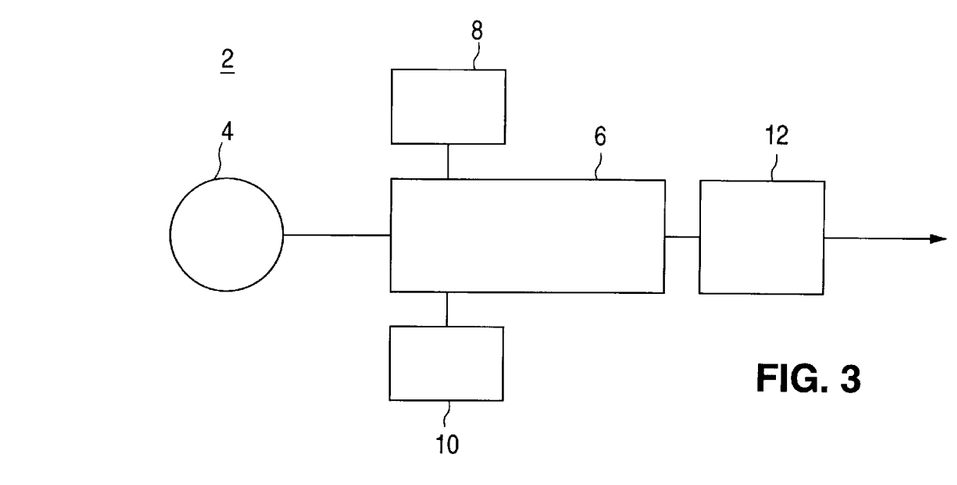
FIG. 3 illustrates the overall water decontamination process and apparatus in accordance with a single stage embodiment of the present invention.

FIG. 3 shows a diagram of an overall single stage water decontamination system 2 in accordance with one embodiment of the present invention. Decontamination system 2 includes a water source 4, at least one high intensity mixing/reaction stage 6, an ozone source 8, a hydrogen peroxide source 10, and an optional post-oxidation treatment area 12.

A step-by-step description of the water decontamination process and apparatus in accordance with the present invention is set forth below.

1. Water Source

Contaminated water flows into decontamination system 2 under an inlet pressure from water source 4. Water from water source 4 typically enters decontamination system 2 at a pressure of greater than 5 psig, with initial pressures most typically between 30 and 50 psig. If water source 4 is a well, the ground water is generally produced at a pressure of greater than 5 psig. If water source 4 is a storage tank, the water is generally pressurized by pump to above 5 psig.

The flow rate of water entering high intensity mixing/reaction stage 6 from water source 4 is typically from about 1 to 3000 gallons per minute. System 2, however, is not limited to handling 3000 gallons per minute.

2. Ozone and Hydrogen Peroxide Sources

Water decontamination system 2 includes an ozone source 8 and a hydrogen peroxide source 10 feeding into high intensity mixing/reaction stage 6.

The processes and apparatuses in accordance with the present invention preferably utilize ozone generated from oxygen rather than from air. Generation of ozone in this manner results in a supply of gas from ozone source 8 containing substantial concentrations of ozone. As shown in FIG. 2, these elevated gas phase ozone concentrations lead to larger quantities of ozone being dissolved in the contaminated water flow.

Specifically, the ozone generator utilized in accordance with the first embodiment of the present invention is an ASTeX Model 8200D modified in order to maintain a pressure in the generator at a higher level than that of the contaminated water flow. This modification precludes water from entering and disabling the generator. Generation of ozone from oxygen in this manner produces a stream of gas having ozone concentrations between 1 and 14% by weight in oxygen, with most typical ozone concentrations between approximately 5% and 9% by weight.

An additional benefit of utilizing ozone in a flow of oxygen from ozone source 8 is that oxygen is itself an oxidant. Because groundwater flowing directly into high intensity mixing/reaction stage 6 from a well is typically devoid of oxygen, the introduction of oxygen along with ozone replenishes the oxygen content of the water, and may oxidize certain COD present in the contaminated water flow. These oxidizable components can be organic, inorganic, or biological in nature.

Hydrogen peroxide source 10 is generally a tank containing $H_2O_2$ provided by outside vendors. Hydrogen peroxide of concentration up to approximately 70% by weight in water is typically utilized, as hydrogen peroxide in concentrations greater than 70% pose the danger of explosion.

3. High Intensity Mixing/Reaction Stage

Figure 4:
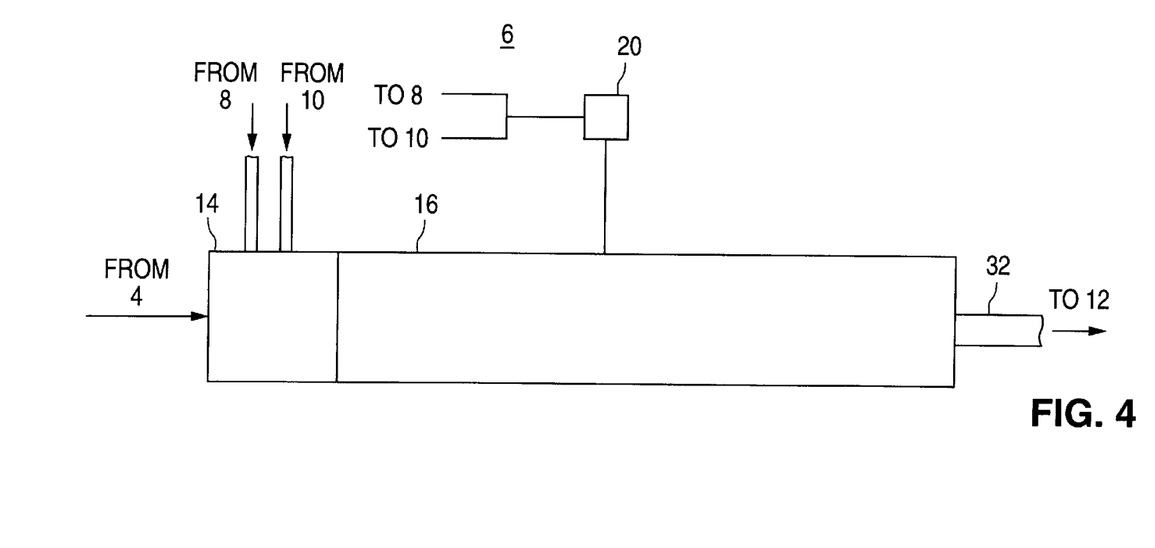
FIG. 4 illustrates a high intensity mixing/reaction stage in accordance with one embodiment of the present invention.

Water from water source 4 is transferred under an inlet pressure to high intensity mixing/reaction stage 6. FIG. 4 shows a detailed view of a high intensity mixing/reaction stage 6 in accordance with one embodiment of the present invention, comprising injection port 14, high intensity mixing/reaction zone 16, and ozone adjustment means 20.

One key feature of high intensity mixing/reaction stage 6 is that water entering under an inlet pressure greater than 5 psig is maintained at near-initial pressure throughout the course of the decontamination process. Maintaining near-initial pressure throughout high intensity mixing/reaction stage 6 facilitates effective oxidation of contaminants by maximizing the ozone introduced into the water flow, and also minimizes the consumption of ozone by reducing wasted ozone that fails to become dissolved in the solution. Each of the individual components of high intensity mixing/reaction stage 6 is discussed in detail below.

A. Injection

As the contaminated water flows into high intensity mixing/reaction stage 6 under an inlet pressure of greater than 5 psig, ozone and hydrogen peroxide are injected.

One key feature of decontamination processes and apparatuses in accordance with the present invention is that the ozone and hydrogen peroxide are injected at velocities and directions approximately matching those of the contaminated water flow. This manner of injection of the oxidizing agents promotes rapid uniform mixing and thereby enhances reaction between the ozone, the hydrogen peroxide, hydroxyl radical, and the contaminants present in the water.

A second key feature of the present invention is that hydrogen peroxide and ozone are injected directly into the contaminated water flow. This "in-line" injection of oxidizing agents eliminates the problems of uneven mixing and elevated local ozone concentrations associated with diversion of a side stream of contaminated water. "In-line" injection also eliminates the need for the additional expensive and complex pumps and piping required for diversion and reintroduction of a such side stream of contaminated water.

Figure 5:
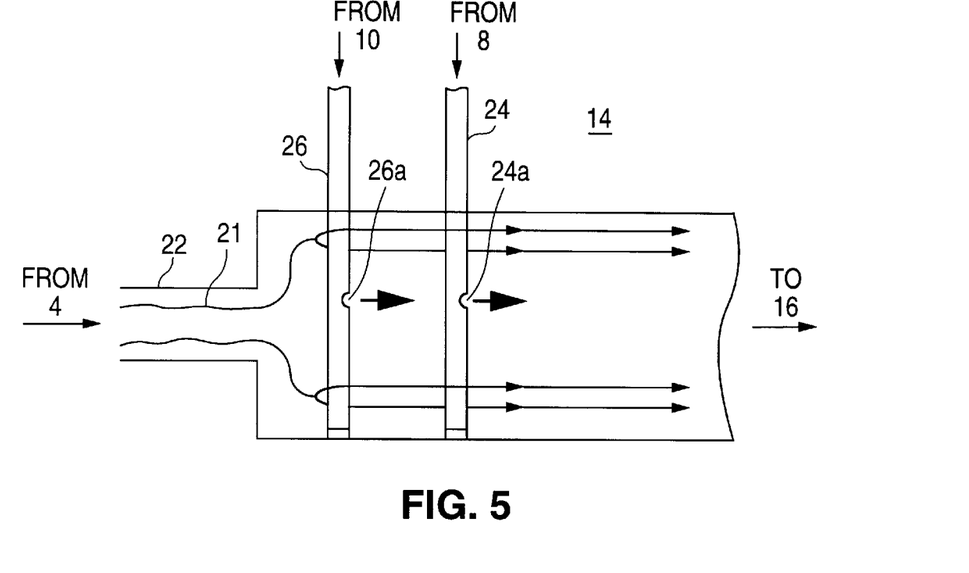
FIG. 5 illustrates an injection port in accordance with the first embodiment of the present invention.

FIG. 5 shows an injection port 14 in accordance with one embodiment of the present invention. Injection port 14 has influent pipe 22, ozone sparge tube 24, and hydrogen peroxide sparge tube 26. Ozone sparge tube 24 and hydrogen peroxide sparge tube 26 project into the interior of injection port 14.

Contaminated water enters injection port 14 through influent pipe 22. Injection port 14 is designed to afford the influent contaminated water an optimum spatial flow rate between approximately 2.0 ft/sec and 15 ft/sec, with 6.5 ft/sec being the preferred spatial flow rate of the contaminated water. The contaminated water then flows through injection port 14 and around ozone sparge tube 24 and hydrogen peroxide sparge tube 26, as shown by arrows 21 that point in the downstream direction.

Hydrogen peroxide sparge tube 26 defines at least one, and preferably more than one, hydrogen peroxide orifice 26a facing downstream. Hydrogen peroxide from the hydrogen peroxide source (not shown) is pressurized and directed into hydrogen peroxide sparge tube 26. The hydrogen peroxide flows through hydrogen peroxide sparge tube 26 until it encounters hydrogen peroxide orifice 26a. The hydrogen peroxide then exits hydrogen peroxide sparge tube 26 through hydrogen peroxide orifice 26a and enters the contaminated water flow.

The volume of hydrogen peroxide flowing into hydrogen peroxide sparge tube 26, and the size of hydrogen peroxide orifice 26a, are selected to ensure that the hydrogen peroxide is introduced into the contaminated water flow at a spatial flow rate approximately matching that of the contaminated water flow. The orientation of the hydrogen peroxide orifice 26a ensures that the hydrogen peroxide is injected in the direction of the water flow.

Ozone sparge tube 24 defines at least one, and preferably more than one, ozone orifice 24a facing downstream. Ozone-containing gas from the ozone source (not shown) is pressurized and directed into ozone sparge tube 24. The ozone-containing gas flows through ozone sparge tube 24 until it encounters ozone orifice 24a. The ozone containing gas then exits ozone sparge tube 24 through ozone orifice 24a and enters the contaminated water flow.

The volume of flow of ozone-containing gas into ozone sparge tube 24, and the diameter of ozone orifice 24a are selected to ensure that the ozone containing gas flows into the contaminated water flow at a spatial flow rate approximately matching that of the water. As with hydrogen peroxide orifice 26a, the orientation of ozone orifice 24a ensures that the ozone-containing gas is injected in the same direction as the contaminated water flow.

Although FIG. 5 shows hydrogen peroxide sparge tube 26 being upstream of ozone sparge tube 24, the order is not significant and the hydrogen peroxide can be introduced to the contaminated water flow either immediately before or after the addition of ozone. The ozone sparge tube and the hydrogen peroxide sparge tube can also be positioned side by side, so long as the manner of injection matches the velocity and direction of the water flow.

Ozone gas and hydrogen peroxide are introduced into the contaminated water flow with a molar ratio of $H_2O_2/O_3$ of between about 0.1 and 10, with a typical range of 0.5 to 4.0. Molar ratios higher than 4 may be necessary in order to eliminate COD that is preferentially oxidized by hydrogen peroxide, allowing the excess hydrogen peroxide to react with ozone to form the hydroxyl radical. The precise amounts and ratios of ozone and hydrogen peroxide ultimately introduced into the water flow are functions of the particular varieties of COD present and their concentrations.

In the first embodiment of the present invention, injection port 14 has a diameter of 8". Water flows into injection port 14 at a rate of 1000 gal/min. The resulting spatial flow rate of the contaminated water through injection port 14 is 6.5 ft/sec. The hydrogen peroxide sparge tube defines two hydrogen peroxide orifices, each having a diameter of 0.004", from which hydrogen peroxide flows at between 0.0001 and 0.00015 ft$^3$/min resulting an a spatial velocity of approximately 6 ft/sec. The ozone sparge tube defines two ozone orifices, each having a diameter of 0.14", from which ozone flows at approximately 1 ft$^3$/min resulting an a spatial velocity for the ozone of approximately 6 ft/sec.

In a second, smaller capacity embodiment of the present invention, injection port 14 has a diameter of ¾". Water flows into injection port 14 at a rate of approximately 6 gal/min. The resulting spatial flow rate of the contaminated water through injection port 14 is approximately 6.5 ft/sec. The hydrogen peroxide sparge tube defines a single hydrogen peroxide orifice having a diameter of 0.002", from which hydrogen peroxide flows at approximately 0.00005 ft$^3$/min resulting an a spatial velocity of approximately 6 ft/sec. The ozone sparge tube defines two ozone orifices each having diameters of 0.002", from which ozone flows at approximately 0.0019 ft$^3$/min resulting an a spatial velocity for the ozone of approximately 6 ft/sec. Only a single hydrogen peroxide orifice is utilized in the second embodiment because of physical constraints in forming an orifice small enough to accommodate the lesser hydrogen peroxide flow required.

B. High Intensity Mixing

Following introduction of the ozone and hydrogen peroxide to the contaminated water flow within injection port 14, the $O_3/H_2O_2/H_2O$ combination is maintained at near-initial pressure (greater than 5 psig) and directed into high intensity mixing/reaction zone 16.

High intensity mixing overcomes inherent mass-transfer limitations of ozone gas into water. High intensity mixing also promotes a uniform mixture of oxidants in the water, thereby optimizing the probability of the hydroxyl radical species encountering and successfully oxidizing COD. High intensity mixing can be accomplished by either a static mixer or a mixer having moving parts.

One criterion for high intensity mixing in accordance with the present invention is that the pressure drop through the high intensity mixing is between about 0.1 to 10 psig. Another criterion for high intensity mixing in accordance with the present invention requires that ozone and hydrogen peroxide concentrations be mixed within 1% uniformity. A further criterion for high intensity mixing in accordance with the present invention is that the 1% uniformity of hydrogen peroxide and ozone concentrations be achieved in a mixing time of less than thirty seconds, and preferably within one second.

Figure 6:
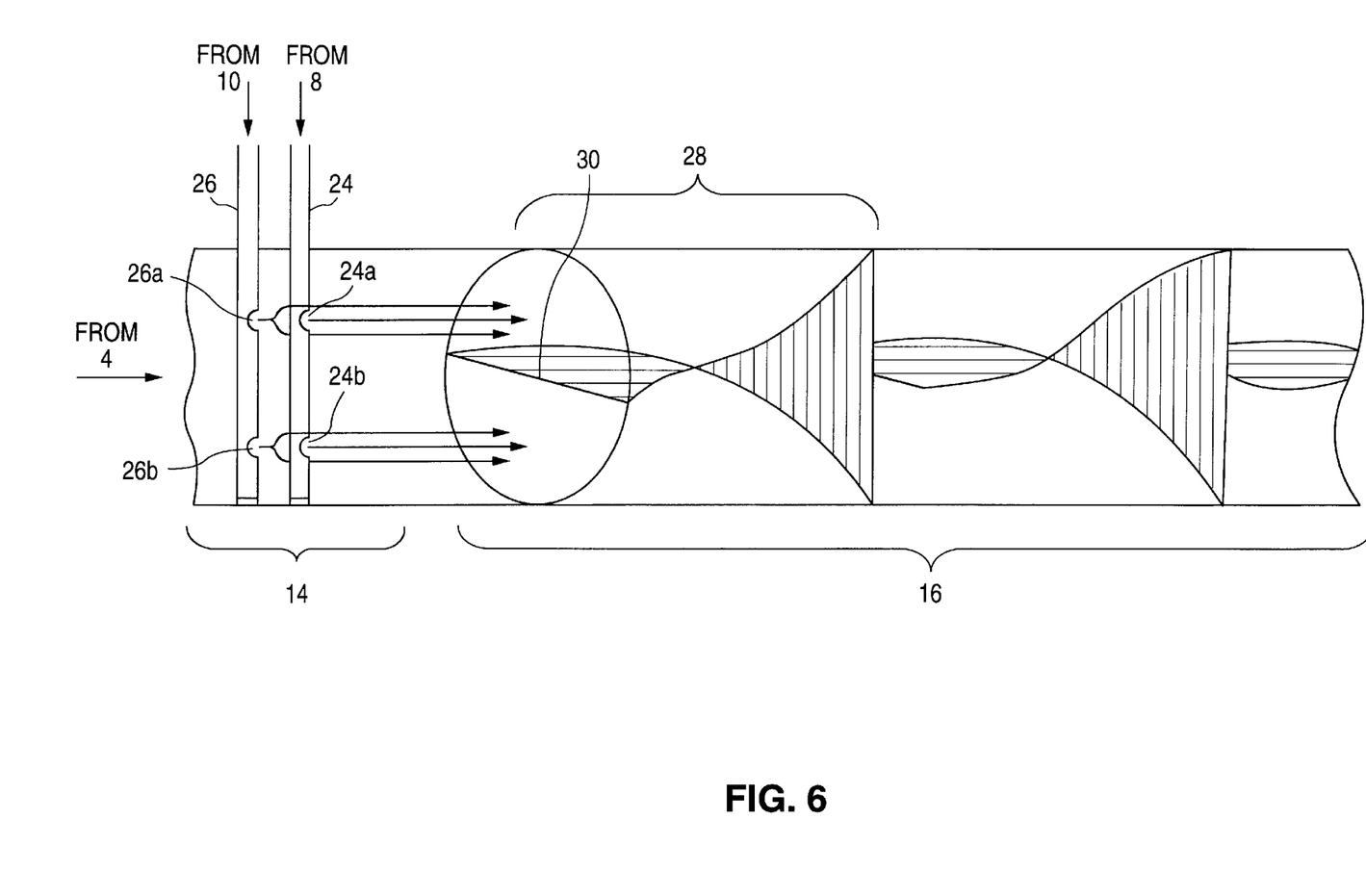
FIG. 6 illustrates the orientation of the injection port relative to the initial portion of the high intensity mixing/reaction zone in accordance with the first embodiment of the present invention.

FIG. 6 shows the orientation of injection port 14 relative to the initial portion of a high intensity mixing/reaction zone 16 in accordance with the first embodiment of the present invention. Injection port 14 includes an ozone sparge tube 24 that defines two ozone orifices, 24a and 24b. Similarly, hydrogen peroxide sparge tube 26 defines two ozone orifices, 26a and 26b.

The initial portion of high intensity mixing/reaction zone 16 consists of a series of static mixing elements 28 having a leading edge 30. Leading edge 30 defines two high intensity mixing phases, one for water traveling on one side of the leading edge 30, and one for water traveling on the other side of leading edge 30.

A key feature the high intensity mixing/reaction zone 16 of the first embodiment is that leading edge 30 lies perpendicular to both the ozone sparge tube 24 and the hydrogen peroxide sparge tube 26, at a height of ½ the diameter of high intensity mixing/reaction zone 16. This spatial orientation of leading edge 30 relative to ozone sparge tube 24 and hydrogen peroxide sparge tube 26 maximizes the solubilization of ozone, and maximizes the uniformity of concentration of both ozone and hydrogen peroxide in the contaminated water flow. This is because ozone injected through first ozone orifice 24a and hydrogen peroxide injected through first hydrogen peroxide orifice 26a enter one phase of high intensity mixing/reaction zone 16, while ozone injected through second ozone orifice 24b and hydrogen peroxide injected through second hydrogen peroxide orifice 26b enter the other phase of high intensity mixing/reaction zone 16.

An exemplary high intensity mixing/reaction zone 16 in accordance with the first embodiment of the present invention utilizes a static mixer, the Chemineer, Inc. Model 8KJS8. This model has a diameter of 8", a length of 8', and a flow rate of 1000 gal/min. The pressure drop across the mixing zone is 4 psig. Greater than 99.5% of the ozone injected into the water flow is ultimately solubilized into the contaminated water flow using this embodiment.

A high intensity mixing/reaction zone 16 in accordance with a second embodiment of the present invention utilizes a static mixer having a diameter of ¾", a length of 8", and a flow rate of 6 gal/min. Because the injection port of the second embodiment of the present invention includes only a single hydrogen peroxide orifice, this orifice is positioned approximately at a height ⅜".

When subjected to high intensity mixing as described above, contaminated water typically contains a concentration of about 0.1 to 10 ppm of ozone by weight, and a concentration of about 0.1 to 70 ppm of hydrogen peroxide by weight.

C. Reaction

Certain varieties of COD are highly susceptible to oxidation, and may already be substantially oxidized at the conclusion of the high intensity mixing. However, other types of COD are more resistant to oxidation, and may therefore require a further period of exposure to the oxidizing species present in the water. Therefore, the latter portion of high intensity mixing/reaction zone 16 may include a region where the mixture is simply maintained under pressure and oxidation occurs.

The total residence time of the $O_3/H_2O_2/H_2O$ mixture in high intensity mixing/reaction zone 16 is that time necessary to consume almost all of the ozone present in the mixture.

Figure 7:
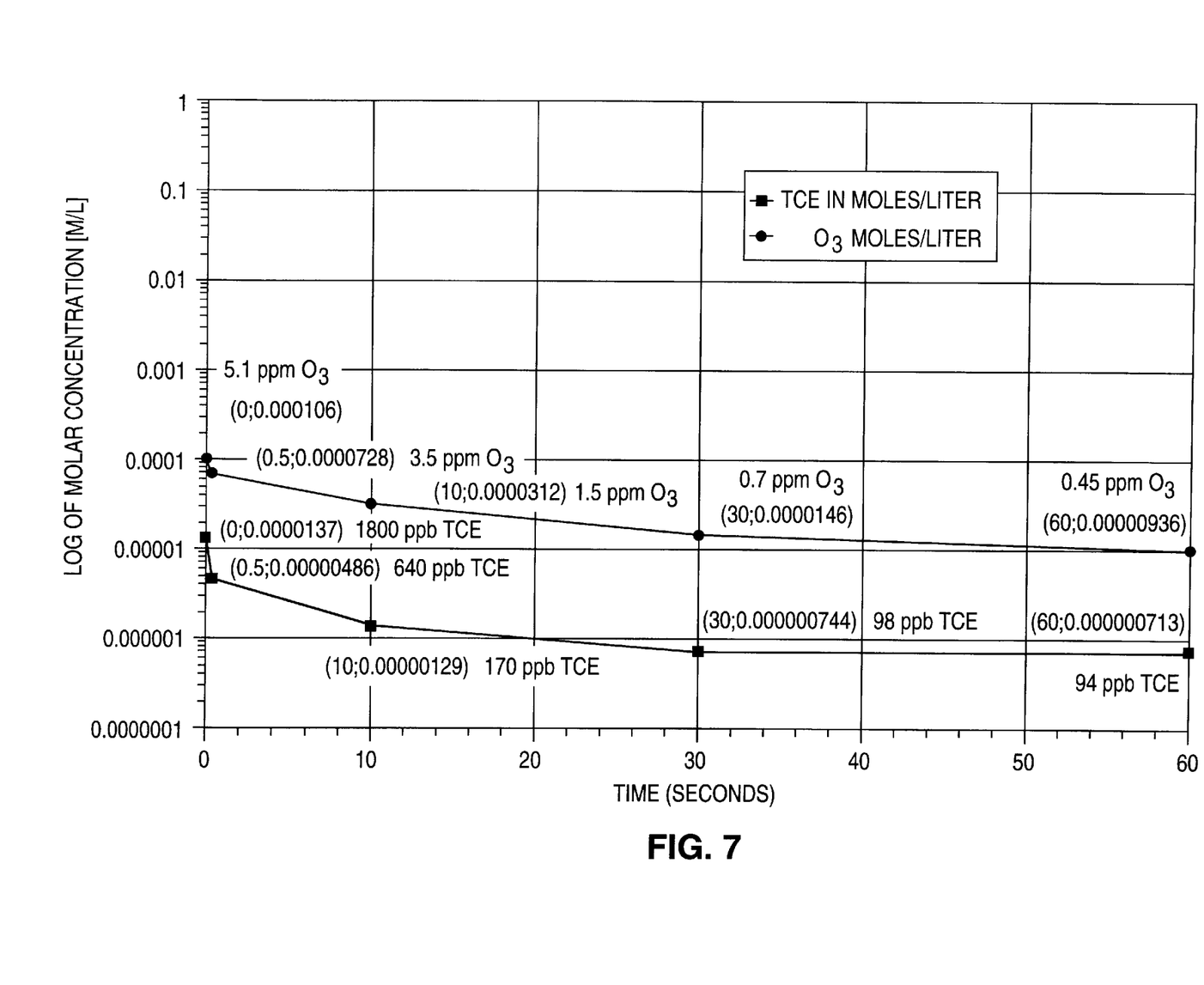
FIG. 7 plots the high intensity mixing/reaction residence time versus the log of molar concentration of both ozone and trichloroethylene, in water treated in a single high intensity mixing/reaction stage in accordance with the first embodiment of the present invention.

FIG. 7 plots residence time in high intensity mixing/reaction zone 16 versus the log of molar concentration, for both ozone and trichloroethylene, in water treated in a single-stage decontamination apparatus in accordance with the first embodiment of the present invention. FIG. 7 reveals that greater than 90% of trichloroethylene (TCE) (from 1800 ppb to 98 ppb) is oxidized in 30 seconds using an initial $H_2O_2\backslash O_3$ mole ratio of 0.5.

By way of comparison, Glaze and Kang report oxidation of only 10–20% of TCE over this same period of time in their conventional oxidation system.

The design of a high intensity mixing/reaction zone in accordance with the present invention is a function of: 1) the flow rate of contaminated water; 2) the amounts of ozone and hydrogen peroxide injected; 3) the pressure drop across the high intensity mixing; and 4) the residence time required to complete high intensity mixing and reaction.

During and immediately after high intensity mixing, ozone reacts with hydrogen peroxide rapidly to reduce the concentration of ozone present in the contaminated water flow. However, excess residual ozone present in the contaminated water flow can also react with bromide to form hypobromite ($BrO^-$), a necessary intermediate in the formation of bromate. Thus, in order to ensure that bromate formation is minimized, the amount of residual ozone present in high intensity mixing/reaction zone 16 is monitored and controlled by ozone adjustment means 20.

Specifically, ozone adjustment means 20 analyzes the ozone concentration present in high intensity mixing/reaction zone 16 following high intensity mixing, and maintains the concentration of residual ozone at 1.0 ppm or less by adjusting the amounts of ozone and hydrogen peroxide sent to injection port 14 by ozone source 8 and hydrogen peroxide source 10. Maintaining residual ozone at about 1 ppm or less allows bromate concentration to be kept below 20 ppb, and preferably below 10 ppb.

D. Multistage Oxidation

After residing for a time in high intensity mixing/reaction zone 16, the water flow exits high intensity mixing/reaction stage 6 through effluent pipe 32. Depending upon the particular application for decontamination system 2, effluent pipe 32 may lead out of decontamination system 2, or may lead 1) to post-oxidation treatments such as granulated activated carbon columns, or 2) to additional high intensity mixing/reaction stage(s).

Treating the contaminated water flow in a series of high intensity mixing/reaction stages poses a number of important advantages. First, multistage oxidation allows less ozone to be introduced at each stage in the decontamination process as compared with a single-stage process. The ability to reduce ozone concentrations introduced at each stage reduces the amount of ozone wasted, rendering a multi-stage decontamination process or apparatus in accordance with the present invention more efficient and economical to operate.

A second advantage of multistage oxidation in accordance with the present invention is the production of lower levels of bromate. Because lower levels of ozone are introduced at each stage of a multistage decontamination process, less residual ozone remains to react with bromide to form hypobromite. The reduction of residual ozone levels thus acts to suppress the formation of bromate.

A third advantage posed by multistage oxidation is that more contaminants are destroyed in a multiple stage process than by a single stage process introducing the same amount of oxidant into the contaminated water flow. This is best illustrated in FIG. 8.

Figure 8:
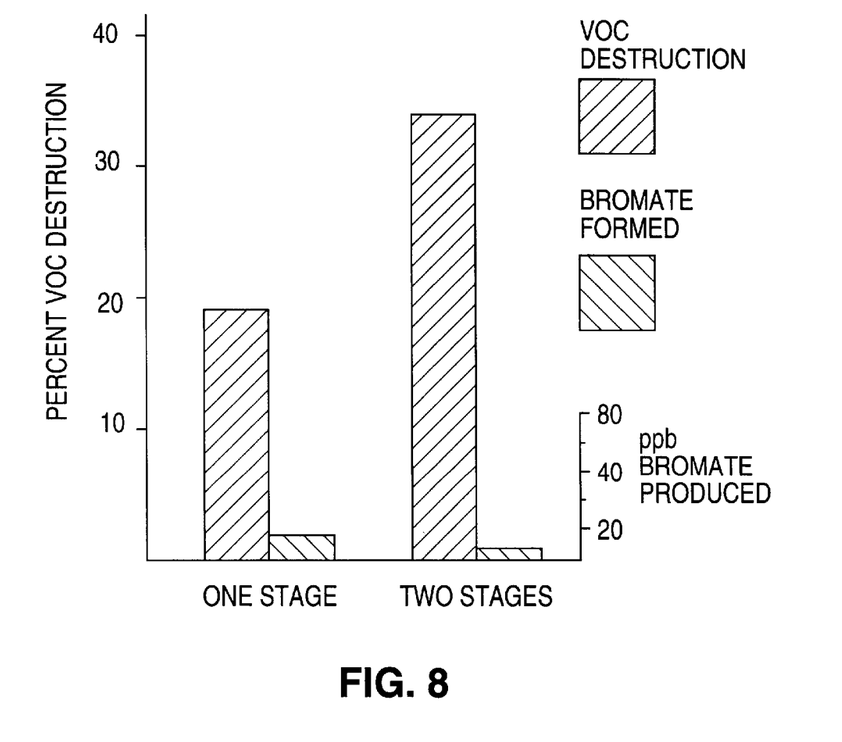
FIG. 8 compares the percentage of VOC destruction and the formation of bromate for a one stage and a two-stage decontamination system in accordance with the first embodiment of the present invention.

FIG. 8 compares the percentage of VOC destruction and the formation of bromate for a one stage and a two-stage decontamination system in accordance with the first embodiment of the present invention. In the single stage process, 0.875 ppm of ozone was injected by a single injector. In the two stage process, 0.375 ppm of ozone was injected by each of the injectors.

FIG. 8 reveals that two stage process achieved a percentage of VOC destruction ($\approx 34\%$) significantly higher than that of the single stage process ($\approx 19\%$). Moreover, the two stage process formed significantly less bromate ($\approx 5$ ppb) than did the single stage process ($\approx 20$ ppb). Furthermore, the two stage process consumed less total ozone (0.75 ppm) than did the single stage system (0.875 ppm).

As described above, a multistage decontamination process in accordance with the present invention is superior to single stage oxidation in almost all respects. The total number of high intensity mixing/reaction stages employed by a particular decontamination system is a function of the particular COD present in the water and the extent of elimination of COD required by a particular application.

3. Post-Oxidation Treatment

Once the contaminated water flow has completed passage through one or more high intensity mixing/reaction stages 6, it may be subjected to certain post oxidation treatments. One example of such a post oxidation treatment is passage of the water flow through activated carbon beds.

In some cases, rapid and complete oxidation of COD according to the present invention may entirely eliminate the need for post-oxidation treatment. The corresponding savings in materials constitutes a further advantage of the process and apparatus of the present invention. However, the freedom to dispense entirely with post-oxidation treatment ultimately depends upon the nature of the particular COD present in the water flow, and the final water quality desired.

4. Variation of $H_2O_2 \backslash O_3$ Molar Ratio

Other researchers have revealed a correlation between the $H_2O_2 \backslash O_3$ molar ratio and the destruction of contaminants and the formation of bromate. For example, in a recent study, Karimi et al., AWWA Journal, Vol. 89, Is. 7, 41–53 (1997) report a relationship between the $H_2O_2 \backslash O_3$ molar ratio and percent destruction of contaminates represented by a curve having a maxima of between 0.5–0.6M $H_2O_2 \backslash O_3$. Karimi et al. also reported the lowest level of bromate formation at a $H_2O_2 \backslash O_3$ molar ratio of 0.6, where a decrease in the ratio to 0.38 resulted in an increase in bromate formation.

Figure 9:
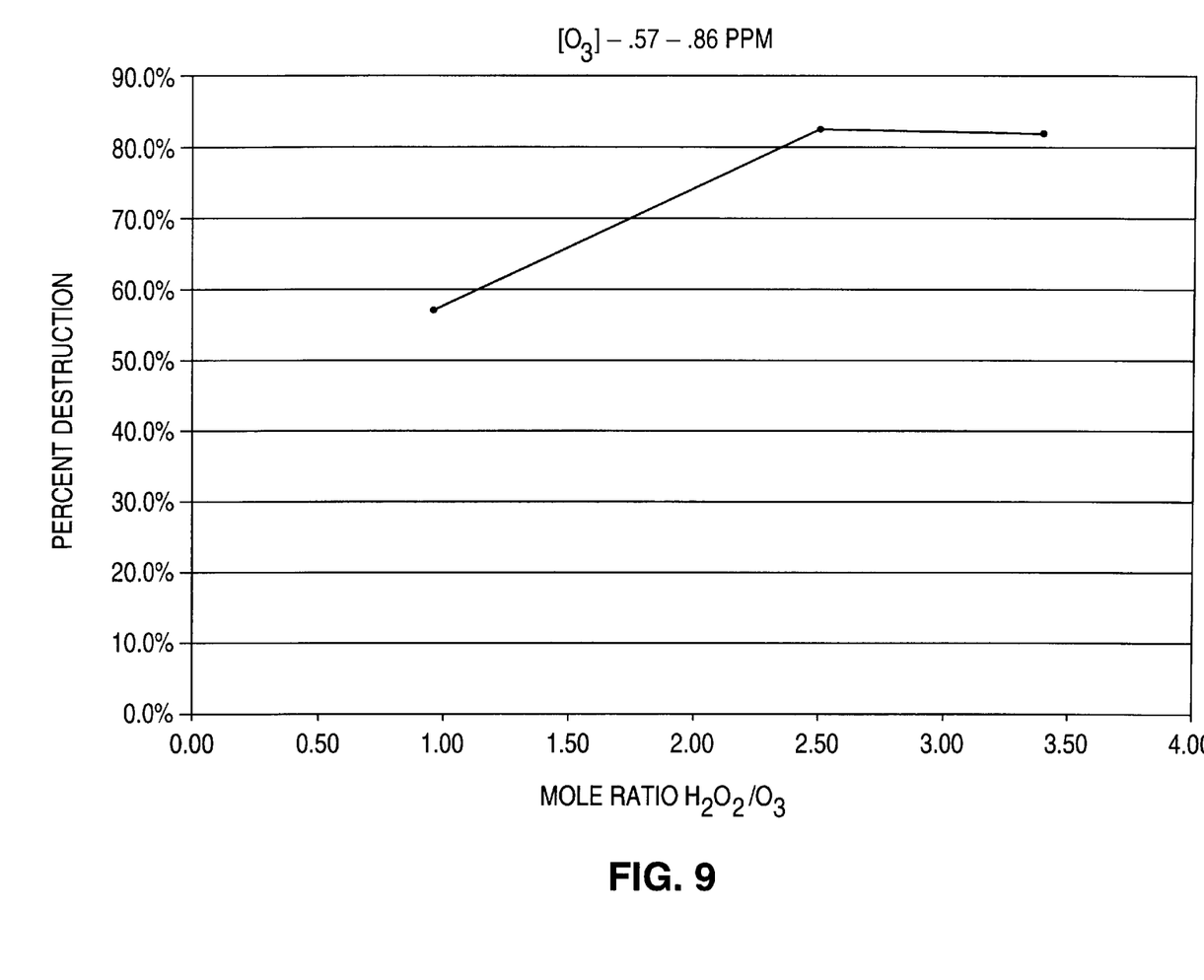
FIG. 9 plots the molar ratio of $H_2O_2/O_3$ versus percent destruction of volatile organic contaminants where the initial ozone concentration is between 0.57 and 0.86 ppm.

FIG. 9 plots the $H_2O_2 \backslash O_3$ molar ratio versus percent destruction of volatile organic contaminants in a three-stage decontamination process in accordance with the first embodiment of the present invention. In this embodiment, ozone is introduced at each high intensity mixing/reaction stage at a concentration of between 0.57 and 0.86 ppm. In marked contrast with Karimi, et al., FIG. 9 reveals increased destruction of contaminants where the molar ratio of $H_2O_2 \backslash O_3$ is increased to at least to 2.5.

Figure 10:
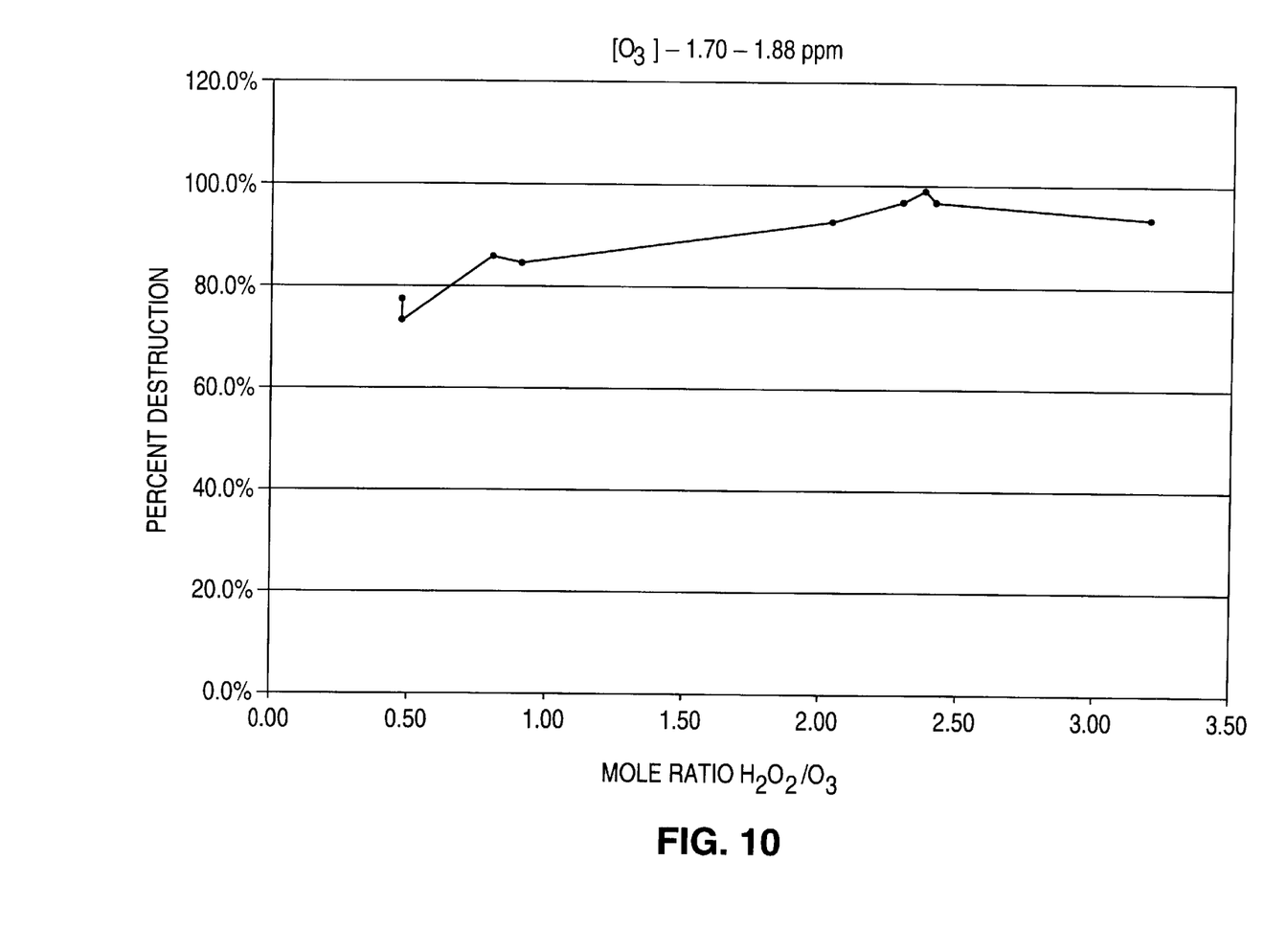
FIG. 10 plots the molar ratio of $H_2O_2/O_3$ versus percent destruction of volatile organic contaminants where the initial ozone concentration is between 1.70 and 1.88 ppm.

FIG. 10 plots the molar ratio of hydrogen peroxide to ozone versus percent destruction of volatile organic contaminants in a decontamination process in accordance with the second embodiment of the present reaction. In this embodiment, ozone is introduced at each high intensity mixing/reaction stage at a concentration of between 1.70 and 1.88 ppm. Examination of FIG. 10 confirms that increasing the molar ratio of $H_2O_2/O_3$ to approximately 2.5 substantially increases the destruction of volatile organic contaminants.

Figure 11:
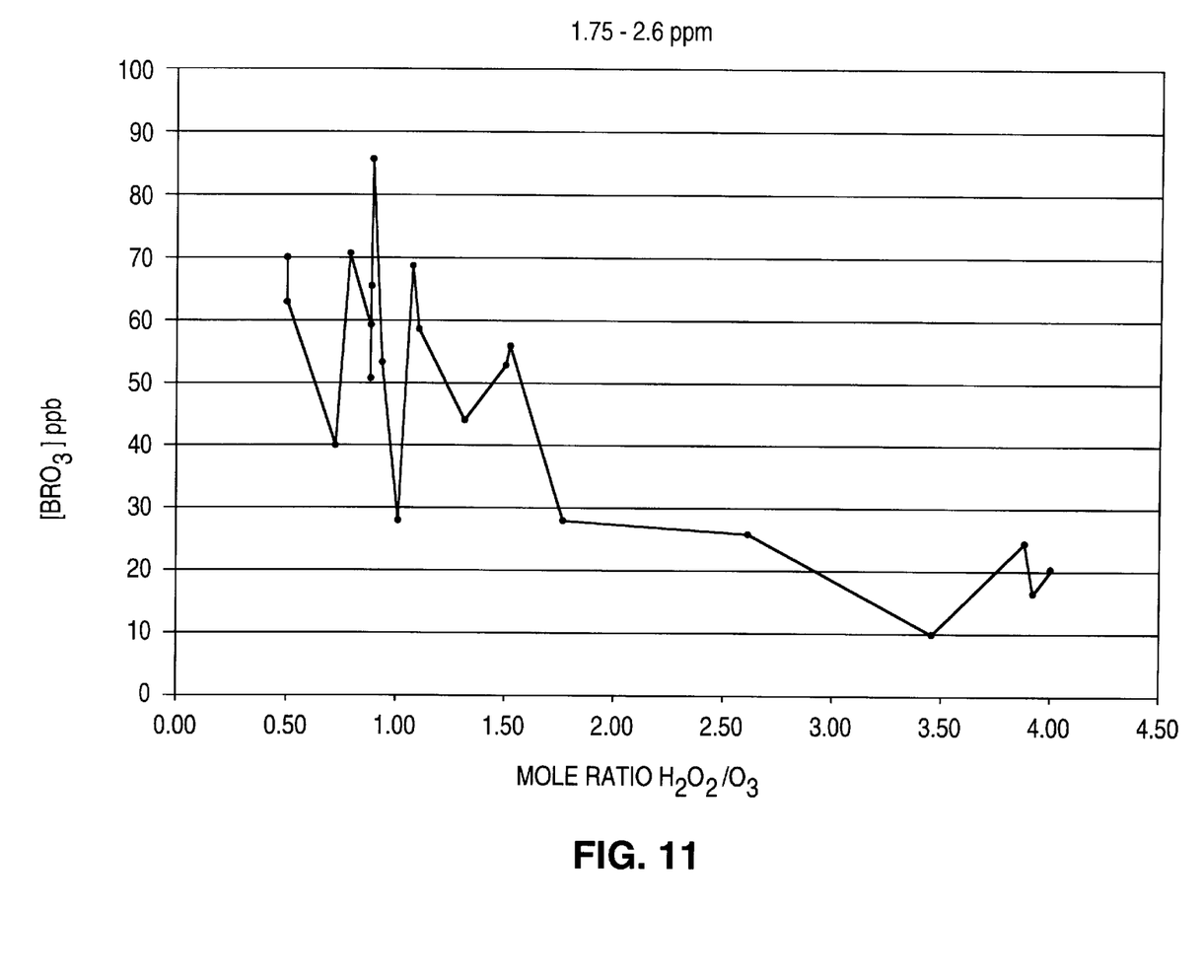
FIG. 11 plots the molar ratio of $H_2O_2/O_3$ versus bromate concentration, where the initial ozone concentration is between 1.75 and 2.6 ppm.

FIG. 11 plots the $H_2O_2/O_3$ molar ratio versus bromate concentration, in a three stage decontamination process in accordance with the first embodiment of the present invention, where injection of the ozone results in an initial ozone concentration of between 1.75 and 2.6 ppm. FIG. 11 illustrates that increasing the molar ratio of $H_2O_2 \backslash O_3$ to 3.5 reduces bromate formation to lower levels than reported by Karimi, et al.

Preliminary experimental results also indicate that increased pH of the water may also reduce bromate formation. When groundwater containing bromide was treated with hydrogen peroxide and ozone in accordance with the present invention, bromate production was reduced from 40 ppb to 10 ppb by increasing the pH of the ground water from 7.4 to 8. The pH of the ground water was adjusted with the addition of sodium hydroxide.

The water decontamination processes and apparatuses described above represent only specific embodiments in accordance with the present invention. For example: 1) the overall number of high intensity mixing/reaction stages; 2) the pressure maintained within the system; 3) the capacity of the high intensity mixing/reaction zone within each stage; 4) the sequence of introduction of the oxidizing agents; 5) the type of high intensity mixer employed; and 6) the concentration of oxidizing agents introduced, can each be varied as disclosed above in order to optimize destruction of contaminants and remain within the scope of the present invention.

Therefore, it is intended that the following claims define the scope of the invention, and that processes and structures within the scope of these claims and their equivalents be covered thereby.

What is claimed is:

1. A water decontamination process, comprising the sequence of steps of:
   injecting a pressurized flow of ozone and a pressurized flow of hydrogen peroxide into a flow of contaminated water such that the velocity and direction of the injected hydrogen peroxide and ozone approximately match the velocity and direction of the contaminated water flow, said contaminated water comprising oxidizable contaminants and having an inlet pressure greater than 5 psig;
   mixing said hydrogen peroxide and ozone with the contaminated water flow at approximately said inlet pressure to produce a mixture at least 99% homogeneous;
   oxidizing said contaminants while maintaining the mixture at approximately said inlet pressure and forming less than 20 ppb of bromate.

2. A process according to claim 1, wherein said homogeneous mixture is achieved in 30 seconds or less.

3. A process according to claim 1, wherein said homogeneous mixture is achieved in less than 1 second.

4. A process according to claim 1, wherein the molar ratio of hydrogen peroxide to ozone injected into the contaminated water flow is between approximately 0.1 and 10.

5. A process according to claim 1, wherein the molar ratio of hydrogen peroxide to ozone injected into the contaminated water flow is between approximately 0.5 and 4.

6. A high intensity mixing/reaction stage for decontaminating water comprising:
   at least one injection port receiving a flow of contaminated water having an inlet pressure of greater than 5 psig, the injection port including
      an ozone sparge tube projecting into the interior of the injection port for receiving a pressurized flow of ozone gas, the ozone sparge tube defining at least one ozone orifice facing downstream of the flow of the contaminated water, and
      a hydrogen peroxide sparge tube projecting into the interior of the injection port for receiving a pressurized flow of hydrogen peroxide from a hydrogen peroxide source, the hydrogen peroxide sparge tube defining at least one hydrogen peroxide orifice facing downstream of the flow of the contaminated water, a high intensity mixing/reaction zone receiving
   a flow of contaminated water, ozone, and hydrogen peroxide at approximately the first pressure from the injection port, the high intensity mixing reaction/zone including a high intensity mixer that creates a uniform mixture of the water, ozone, and hydrogen peroxide while maintaining the pressure at approximately the first pressure, and
   an ozone adjusting means monitoring the level of residual ozone downstream from the high intensity mixer and adjusting the flow of ozone and hydrogen peroxide into the injection port.

7. A high intensity mixing/reaction stage for decontaminating water in accordance with claim 6, wherein the high intensity mixer includes a series of static mixing elements having a leading edge oriented perpendicular to the ozone sparge tube and the hydrogen peroxide sparge tube and defining a first side and a second side, and the hydrogen peroxide sparge tube defining a first and a second hydrogen peroxide orifice and the ozone sparge tube defining a first and a second hydrogen peroxide orifice, such that ozone and hydrogen peroxide injected from the first orifices flow to the first side of the leading edge, and ozone and hydrogen peroxide injected from the second orifices flow to the second side of the leading edge.

8. A water decontamination apparatus wherein a plurality of high intensity mixing/reaction stages in accordance with claim 6.

* * * * *

UNITED STATES PATENT AND TRADEMARK OFFICE
CERTIFICATE OF CORRECTION

PATENT NO. : 5,851,407
DATED : December 22, 1998
INVENTOR(S) : Michael McNeilly et al.

It is certified that error appears in the above-identified patent and that said Letters Patent is hereby corrected as shown below:

Column 7,
Lines 62-63, please change "ozone" to -- hydrogen peroxide --.

Column 12,
Line 34, please change "hydrogen peroxide" to -- ozone --.

APPLIED PROCESS TECHNOLOGY, INC. is the assignee of the entire right, title, and interest of U.S. Patent No. 5, 851,407 by assignments dated November 25, 1997 and November 26, 1997. The assignments were recorded in the U.S. Patent and Trademark Office on November 6, 1998 at Reel 9555, Frame 0463.

Signed and Sealed this

Fourteenth Day of August, 2001

*Attest:*

NICHOLAS P. GODICI
*Attesting Officer*  *Acting Director of the United States Patent and Trademark Office*